(12) United States Patent
Thomas

(10) Patent No.: US 6,463,887 B1
(45) Date of Patent: Oct. 15, 2002

(54) ANIMAL RESTRAINT DEVICE AND METHOD

(76) Inventor: Richard Thomas, 5336 Coral Gables Dr., Las Vegas, NV (US) 89130

( * ) Notice: Subject to any disclaimer, the term of this patent is extended or adjusted under 35 U.S.C. 154(b) by 0 days.

(21) Appl. No.: 09/608,348

(22) Filed: Jun. 29, 2000

(51) Int. Cl.[7] .............................................. A01K 27/00
(52) U.S. Cl. ....................... 119/850; 119/855; 119/856; 119/863; 119/815
(58) Field of Search .................................. 119/729, 850, 119/855, 856, 863, 815; D30/144, 151, 152

(56) References Cited

U.S. PATENT DOCUMENTS

| | | |
|---|---|---|
| 892,946 A | 7/1908 | Duckett |
| 1,208,816 A | 12/1916 | Metts |
| 1,347,352 A | 7/1920 | Ricks |
| 1,718,728 A | 6/1929 | Badura |
| 1,724,768 A | 8/1929 | Mickelsen |
| 2,690,161 A | 9/1954 | Isaac |
| 2,956,542 A | 10/1960 | Mueller |
| 3,013,530 A * | 12/1961 | Zeman |
| 3,036,554 A * | 5/1962 | Johnson ....................... 119/850 |
| 3,062,183 A | 11/1962 | Tate |
| 3,072,098 A * | 1/1963 | Boemle |
| 3,115,867 A | 12/1963 | Meyerotto |
| 3,153,399 A * | 10/1964 | Koon |
| 3,387,588 A | 6/1968 | Bird |
| 3,540,417 A | 11/1970 | Reed |
| 4,200,057 A * | 4/1980 | Agar ........................... 424/9.8 |
| 4,413,588 A | 11/1983 | Lindholm |
| 4,476,814 A | 10/1984 | Miller |
| 5,012,764 A | 5/1991 | Fick et al. |
| 5,197,414 A * | 3/1993 | Kanakura .................... 119/839 |
| 5,349,927 A * | 9/1994 | Campbell .................... 119/815 |
| 5,642,687 A * | 7/1997 | Nylen et al. ................ 119/52.3 |
| 5,797,354 A * | 8/1998 | Marschall ................... 119/815 |

* cited by examiner

Primary Examiner—Yvonne R. Abbott
(74) Attorney, Agent, or Firm—Weide & Miller, Ltd.

(57) ABSTRACT

An animal restraint device is comprised of two identical mating collar elements, each element having a pair of outwardly extending legs and having at least one passage on one leg and at least one tab on an opposing leg such that the two elements may be connected by passing the respective tabs of each element through the respective passages of the other element, whereby when connected the elements define an aperture for receiving the animal's neck. A method comprises engaging a pair of collar members such that when connected, a neck of the animal to be restrained is positioned in an opening defined by recesses of the first and second collar members, the engaging step comprising engaging a locking member associated with each of the collar members with a passage associated with the other of the collar members.

22 Claims, 2 Drawing Sheets

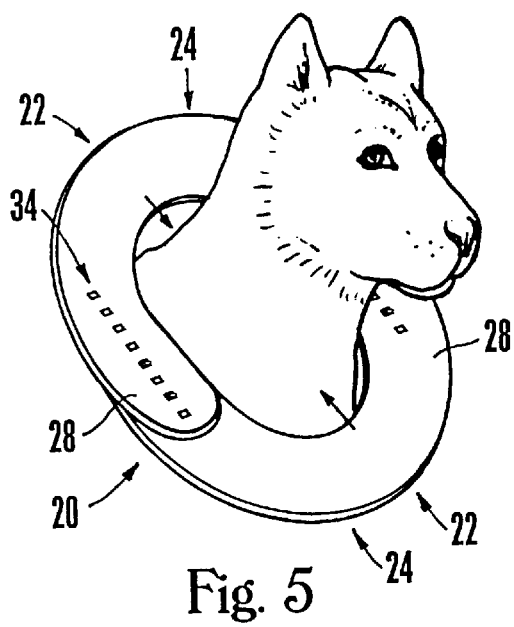
Fig. 5
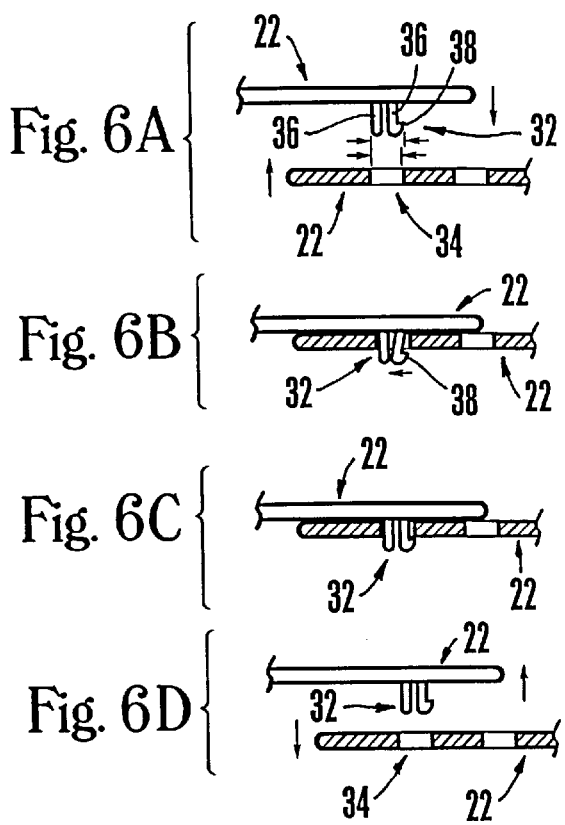
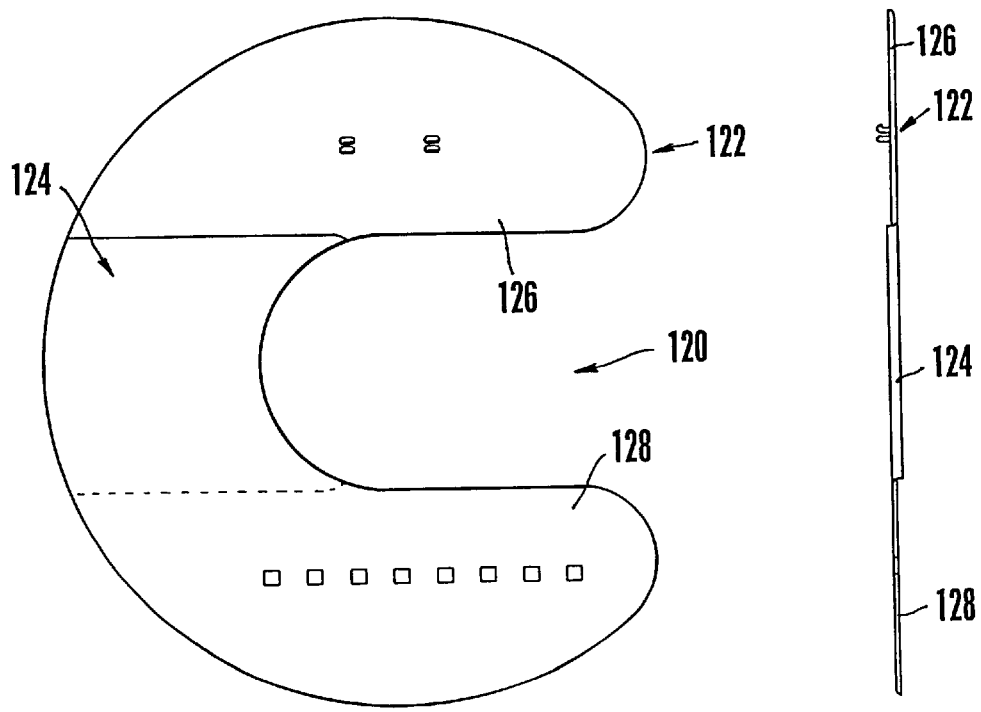
Fig. 7
Fig. 8

ANIMAL RESTRAINT DEVICE AND METHOD

FIELD OF THE INVENTION

The present invention relates to a device and method for restraining an animal, and more specifically, to a device and method for increasing the profile of an animal to prevent the animal from passing under or through gates, fences, and other openings or spaces.

BACKGROUND OF THE INVENTION

Animal owners are familiar with the difficulties involved with confining their animals to one location. For example, dogs tend to burrow under and through gates, fences, and other similar enclosures. Many problems may arise when an animal escapes their enclosure. For example, if the animal escapes an enclosed yard, the animal may roam onto a street or to adjacent homes. Among others, the animal might inflict damage to property, people, or other animals or could be injured in or cause a traffic accident. In addition, small and young animals have a tendency to wander and become stuck in small areas which could result in injury or death. The animal owner may also simply wish to restrain or confine their animal to certain areas of their home, or prevent the animal from getting under furniture or the like.

Many devices and methods have been used to restrain animals, among these being collars and yokes of differing configurations. Some of these devices utilize collars with metal protrusions which could hurt other animals or humans which might come into contact with the restraint device. Still other devices utilize complex locking mechanisms or complex methods for restraining the device on the animal's neck. Some of these devices can be relatively complex to manufacture and use.

An effective animal restraint device which is easy to apply, remove, adjust, and manufacture is desired.

SUMMARY OF THE INVENTION

In accordance with the present invention, there is provided a device and method for restraining an animal.

One or more embodiments of the invention comprise a device for restraining an animal. One device is comprised of two identical mating collar members or elements, each element having a pair of outwardly extending legs and at least one passage on one leg and at least one tab on an opposing leg such that the elements may be connected by passing the respective tabs of each element through the respective passages of the other element, and whereby when the elements are connected, they define an enclosed aperture designed to receive the neck of the animal to be restrained.

In a preferred embodiment, the identical mating elements of the device are generally planar, arch-shaped, molded from a rigid plastic material, and have multiple passages formed therein in a row so that the relative positions of the elements when connected, and thus the size of the aperture defined thereby, may be adjusted. Preferably, the aforementioned tabs are an integrally formed portion of the elements, comprising a pair of spaced protrusions which must be biased inwardly towards one another to pass through one of the passages. Also in accordance with a preferred embodiment, the tabs have at least one catch on at least one of the protrusions for engaging the other element when passed through a passage thereof such that the connected elements can only be released by biasing the protrusions inwardly towards one another to release the catch.

In an alternative embodiment, at least a portion of each element's legs has a reduced thickness such that the entire device has a uniform thickness when the elements are connected to form the aperture.

One or more embodiments of the invention comprise a method for restraining an animal. One method is comprised of the steps of providing first and second collar members with arcuate recesses formed therein, each collar member having at least one passage formed therethrough and at least one locking member extending therefrom, and engaging the collar members such that when connected a neck of the animal to be restrained is positioned in an opening defined by at least one of the recesses of the first and second collar members, the engaging step comprising engaging a locking member associated with each of the collar members with a passage associated with the other of the collar members.

In a preferred embodiment, the collar members have multiple passages, and the locking members are comprised of at least two tab members spaced apart from one another. Also in accordance with a preferred embodiment, the method further includes the steps of adjusting the size of the opening by selecting the passages the locking members are engaged with, and disconnecting the collar members by compressing protrusions comprising the tab members towards one another.

The device and method of the present invention advantageously provide an effective manner by which one can restrain an animal. In one or more embodiments of the invention, the animal to be restrained is a dog. With no metal or moving parts, the simple design of the present invention is safe and makes the device easy to apply, remove, adjust, and manufacture.

Further objects, features, and advantages of the present invention over the prior art will become apparent from the detailed description of the drawings which follows, when considered with the attached figures.

DESCRIPTION OF THE DRAWINGS

FIG. 5 is an enlarged perspective view of the restraining device of the invention placed about an animal's neck;

FIG. 6A is an enlarged, partial cross-sectional view illustrating how a tab of one collar member engages a passage of another collar member;

FIG. 6B is a view of the tab and passage of FIG. 6A as the tab is being biased to pass through the passage;

FIG. 6C is a view of the tab and passage of FIG. 6B after the tab has been passed through the passage, thus connecting the collar members;

FIG. 6D is a view of the tab and passage of FIG. 6C after the tab has been disengaged from the passage, thus disconnecting the collar members;

FIG. 7 is a top view of a collar member in accordance with another embodiment of the invention; and FIG. 8 is a side view of the collar member illustrated in FIG. 7.

DETAILED DESCRIPTION OF THE INVENTION

The invention is a device and method for restraining an animal. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, one or more embodiments of the invention comprise a device and method for restraining an animal. As used herein, the term "animal" may include a wide variety of beings. In a preferred embodiment of the invention, the animal comprises a dog.

Figure 1:
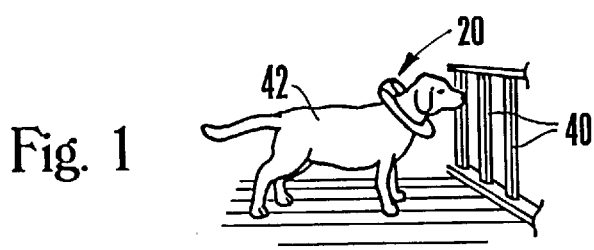
FIG. 1 is a side view of an animal wearing a restraining device comprising a pair of mating collar members in accordance with one embodiment of the present invention.

Referring to FIG. 1, there is illustrated a restraining device 20 in accordance with an embodiment of the present invention. In general, the restraining device 20 is useful in increasing an effective dimension of an animal when the device 20 is placed thereon. As described in more detail below, when placed on an animal 42, the device 20 is useful in limiting or preventing the passage of the animal through or into various spaces, as a result of the engagement of the device 20 with a structure surrounding or defining the opening or space.

Figure 2:
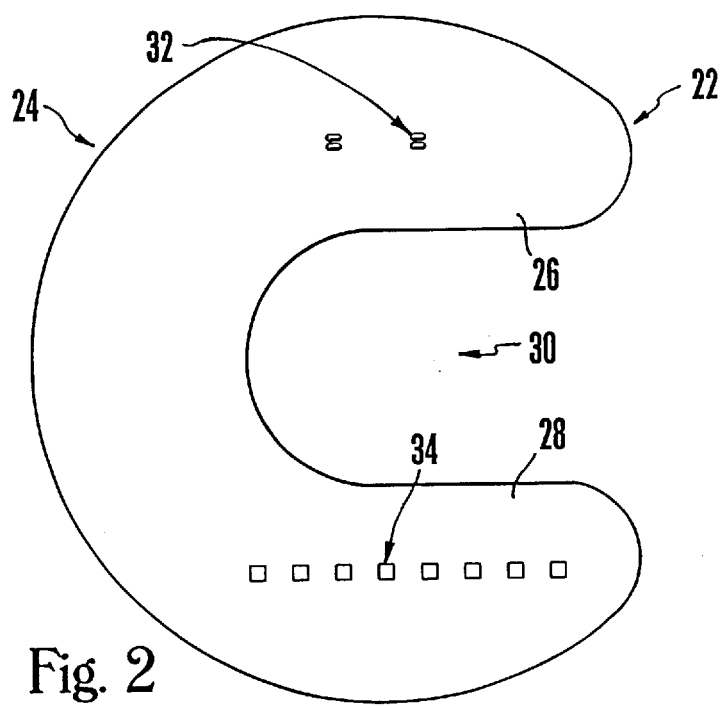
FIG. 2 is a top view of a collar member of the device illustrated in FIG. 1.

Referring to FIG. 2, the restraining device 20 preferably comprises an identical pair of mating elements or collar members 22. In one or more embodiments, each collar member 22 has a body 24. In a preferred embodiment, the body 24 is generally arch or "C"-shaped. The body 24 includes first and second legs 26,28 located generally opposite one another and separated by an open, cut-away area 30. The first and second legs 26,28 each have a first or proximal end, the first ends connected via the body 24. The first and second legs 26,28 each have a second, distal or free end. The second ends of the legs 28 are separated by the cut-away area 30.

Figure 3:
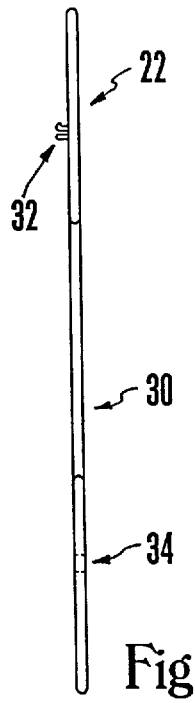
FIG. 3 is a side view of the collar member illustrated in FIG. 2.

In a preferred embodiment, and referring to FIG. 3, the body 24 of each collar member 22 is generally thin in thickness, and is generally planar. In general, it is desirable that the restraining device 20 not buckle, fold or the like when in use, which could defeat the restraint feature of the device. Thus, each collar member 22 is preferably constructed from a rigid plastic or similar material. Of course, each collar member 22 may be constructed from other materials, such as wood or metal. When constructed of plastic, the collar members 22 may be efficiently molded.

In one embodiment, the cut-away portion 30 is generally arcuate and about 3 inches wide and deep. The body 24 is about 0.07–0.08 inches thick. The body 24 is about 8 inches in radial dimension from a center located in the cut-away area 30.

Figure 4:
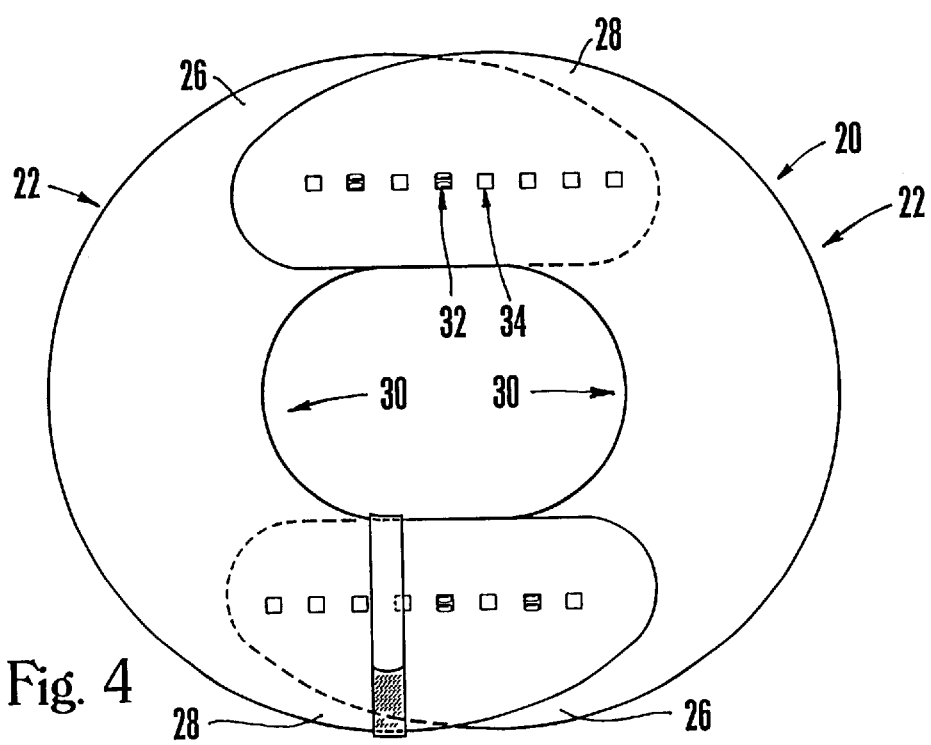
FIG. 4 is a top view of the device illustrated in FIG. 1.

Referring to FIGS. 2–4, means are provided for selectively connecting two of the collar members 22. In a preferred embodiment, each collar member 22 has a first locking member thereon for use in engaging a second locking member of a collar member 22 to which it is to be mated. In one embodiment, the at least one first locking member of each collar member 22 comprises at least one tab 32 provided on one of the legs 26,28. In addition, each collar member 22 has a second, mating locking member, preferably in the form of at least one passage 34 formed through the other leg 26,28. As illustrated, in a preferred embodiment, a pair of tabs 32 are provided on the first leg 26, and at least two passages 34 are provided through the opposing leg 28. The tabs 32 are positioned so that they will engage two of the passages 34 of an opposing collar member 22.

Preferably, a number of passages 34 are provided through the leg 28 of each collar member 22. The passages 34 are preferably aligned along a common axis extending generally along the length of the leg 28. The passages 34 are spaced apart from one another, permitting the tabs 32 on another collar member 22 to engage them in one or more positions, as described in more detail below. Each passage 34 is shaped to accept in a locking, press-fit fashion (as described below) a tab 32. In one embodiment, each passage 34 is generally square in shape.

Referring to FIGS. 6A–6D, each tab 32 preferably comprises a pair of spaced apart protrusions 36. One of the protrusions 36 has a catch 38 extending from a distal end (i.e. the end away from the body 24 of the collar member) thereof. The protrusions 36 are preferably arranged so that, as illustrated in FIG. 6B, they must be biased inwardly towards one another to pass through one of the passages 34. As described below, the catch 38 is preferably arranged to engage the body 24 of a mating collar member 22.

Use of the restraint device 20 will now be described in detail with reference primarily to FIGS. 4–6. A user obtains two of the collar members 22. Advantageously, each collar member 22 is identical (i.e. there is no "right" or "left" member or the like), so that any two of the members 22 may be utilized.

A user locates a first of the collar members 22 so that a portion of the animal's neck is located in the cut-away area 30 thereof. The user then engages the second of the collar members 22 with the first. The user arranges the first and second collar members 22 so that the tabs 32 on each collar member 22 engage the passages 34 of the other collar member 22. This only requires that the user reverse the orientation of the two collar members 22 with respect to one another. In other words, the collar members 22 are arranged so that the leg 26 having the tabs 32 thereon of a first collar member is positioned on the same side of the animal's neck as the leg 28 having the passages 34 therethrough of the second or other collar member 22. Further, the user arranges the legs 26,28 of the opposing collar members 22 in alternating overlapping positions, as illustrated in FIG. 4 to permit the tabs 32 to be pressed through the passages 34.

Next, the user presses the tabs 32 of each collar member 22 through the mating passages 34 of the other collar member 22. As illustrated in FIG. 6A, each tab 32 must first be aligned with its respective passage 34. Next, referring to FIG. 6B, each tab 32 is pressed through its mating passage 34. This requires that the protrusions 36 of the tab 32 be biased inwardly towards one another, reducing the dimension of the tab 32 sufficiently for it to pass through the passage 34. Once pressed therethrough, as illustrated in FIG. 6C, the catch 38 engages a back or opposing side of the collar member 22 through which it was passed.

Referring to FIG. 5, once the collar members 22 are engaged, the restraining device 20 encircles the animal's neck. In particular, the cut-away portions 30 of the collar members 22 cooperate to form a central passage or opening which is generally enclosed on all sides by the two bodies 24 of the collar members 22. At the same time, the collar members 22 extend outwardly from the animal's neck, thus effectively increasing the dimension of the animal in that location.

Referring to FIG. 1, once the restraining device 20 is placed on an animal, the device 20 is useful in preventing the animal from entering or passing through a variety of spaces. For example, the device 20 is useful in preventing an animal from passing through the space between pairs of deck rails 40. When the animal attempts to pass through the deck rails 40, the device 20 engages the rails 40 and prevents the animal from moving therethrough. Of course, the device 20 is useful in preventing an animal from passing through a variety of spaces, such as under fences and the like. In general, the size of the passage or space into which an animal is restrained from entering is limited only by the size of the space/passage as defined by the location of the surrounding structure, in relation to the size of the restraining device 20. Of course, the collar members 22 may be made larger to increase the size of the restraining device 20, and thus the size of the space which the animal is prevented from passing through.

Referring again to FIG. 5, means are provided for adjusting the size of the central passage or opening which is defined by the mating collar members 22. As will be appreciated, animals have a variety of different sized necks and heads. It is desired that the collar members 22 be connected in a position such that the resultant central opening is not sufficiently large to permit the animal to remove the restraining device 20 by pulling its head backwardly through the opening. In addition, it is desirable for the central opening to be sufficiently large that the device 20 does not constrict the animal's neck when placed thereon.

In the preferred embodiment of the invention, the means for adjusting comprises the tabs 32 and multiple passages 34 for engagement thereby. When a user is connecting the collar members 22, the user selects the appropriate passages 34 which the tabs 32 are to engage so that the resultant central opening has a size which meets the above-described criteria. In order to reduce the size of the opening, the user engages the tabs 32 of each collar member 22 with respective passages 34 on the other collar member 22 which are located nearest the base or first end of each leg. On the other hand, to increase the size of the opening, the user engages the tabs 32 of each collar member 22 with the passages 34 on the other collar member 22 which are located nearest the free ends of the legs 26,28.

FIGS. 7 and 8 illustrate another embodiment of a collar member 122 of a restraining device in accordance with the invention. In general, this embodiment collar member 122 is the same as that illustrated in FIGS. 2 and 3, except as to the dimensions of a body 124 thereof. In this embodiment, the body 124 of the collar member 122 has a first thickness. The legs 126,128 thereof have a second thickness. The first thickness is preferably approximately equal to two times the second thickness. In this arrangement, when a pair of the collar members 122 are mated, the thickness of the restraining device 120 remains generally constant. Of course, the thicknesses of the portions of the collar member 122 are chosen, when considering the material used, so that the device 120 does not readily buckle or the like, but instead maintains its shape to restrain an animal when in use.

This arrangement reduces the amount of material which is necessary to form the device 122. In addition, when connected, the legs 126,128 of the collar members 122 are inset in relation to the body 124 of the other collar member 122. This arrangement reduces the likelihood of material slipping between the mated legs 126,128 and either forcing the collar members 122 apart or causing the animal to get caught up.

Of course, a variety of arrangements of collar members other than those described and illustrated above are contemplated. For example, there may be as few as one tab 32 or more than two. The collar members 32 may be arranged with tabs 32 on both legs, as opposed to just one. In such event, passages are preferably provided on both legs so that the collar members doubly engage one another when connected in that at least one tab from each collar member engages a passage of the other, when considering a single pair of the legs as connected. There may also be as few as one passage 34 or a greater number than those illustrated.

The tabs 32 need not be configured as illustrated. For example, each tab 32 may comprise a single protrusion, with pairs of tabs 32 located and arranged to cooperate to engage passages in a manner which retains the collar members 22 connected. Where multiple tabs 32 are provided, the tabs 32 need to be aligned. In such event, of course, the mating passages 34 must be offset and not provided along a common axis as illustrated.

Other means for selectively connecting the collar members 22 (i.e. permitting the collar members 22 to be connected and disconnected at the desire of the user) may also be provided instead of, or in addition to, the tabs 32 and passages 34. Such means may comprise snap-fit type members, elongate slots and pins or similar means.

The collar members 22 need not be arch or "C"-shaped. As illustrated, an outer peripheral edge of the collar members 22 generally forms a "C." This peripheral edge may be more rectangular or square, or may undulate. Those of skill in the art will appreciate that the size of the opening or passage which an animal is restrained from passing through is related to the total dimension of the restraining device 20 when placed on the animal. Thus, the peripheral edge may have areas which extend outwardly further than others to effectively increase this outward dimension and prevent the animal from passing through larger areas.

The dimension of the collar members 22 may also vary. For example, one leg may be longer than the other or the legs may both be longer in relation to their separation. While it is preferred that the collar members 22 be generally planar and thin, they may be thick or have a varying thickness. For example, the collar members 22 may be provided with reinforcing ribs to strengthen them and reduce the probability of buckling.

The cut-away area 30 of each collar member 22 is preferably generally arcuate. However, the cut-away areas 30 may have a variety of other shapes, such as generally square or triangular. The arcuate shape of the cut-away is particular desirable since, when the collar members 22 are connected, the resultant central opening is generally circular or oval, having no sharp corners or transitions. Thus, the collar member 22 will smoothly rotate around an animal's neck, not hanging up or pinching the animal's neck in any location.

The collar members 22 may be constructed of a glow-in-the-dark, reflective or similar material for safety purposes. Alternatively, reflective devices or the like may be placed thereon. The collar members 22 may be also made in a variety of colors.

The restraining device 20 of the present invention has numerous benefits. First, the restraining device 20 comprises a pair of mating, identical collar members 22. Because the collar members 22 are identical, the device 20 is inexpensive to manufacture, and easy to use. In particular, manufacture of the device 20 only requires a single mold for production of both collar members 22, which form the entire restraining device 20. A single device 20 simply comprises two of the collar members 22 packaged with one another.

When molded, the restraining device 20 does not require further assembly, such as the addition of clips, hinges or the like. Use of the device 20 is simple because a user need not identify whether they have a correct "pair" of the members: any two of the members will mate since they are identical.

If a user loses one of the members 22, the user may obtain a single replacement without regard to any specific configuration (such as left or right). The restraining device 20 also does not require small clips or other items which may be lost. The user may easily connect and disconnect the members many times, to place the device 20 on, or remove the device from, the animal as desired.

The thin construction of the collar members 22 allows them to be conveniently packaged and shipped at low cost. The collar members 22 are lightweight as well. Because of their weight and shape, the collar members 22 may be packaged in dog food sacks or boxes as promotional items. In addition, because the collar members 22 are relatively lightweight, the device 20 is not a bother to the animal. At the same time, though the collar members 22 are lightweight and generally thin, the device 20 is sufficiently rigid and strong so that it is effective in restraining the animal.

The configuration of the collar members 22 permits them to be adjusted with respect to one another so that the device 20 can be adapted to fit a wide variety of different animals or animals having different sizes and shapes. Further, the collar members 22 can be entirely separated, making them easier to place on an animal, to remove, and to store. For example, this arrangement avoids problems with "swivel" type yokes where the degree of opening is limited by the amount of swivel.

The locking mechanism of the tabs 32 with the passages 34 is effective in maintaining the collar members 22 coupled to one another until the user (and not the animal) elects to de-couple them. The locking arrangement is effective in maintaining the collar members 22 connected even when worn by a larger animal, such as a dog, and even when the animal presses the device 20 against items or attempts to pull or remove it, such as with a paw.

In one or more embodiments of the invention, other or additional locking mechanisms may be utilized to ensure that the collar members 22 do not separate when worn by the animal. For example, hook and loop material may be used as a locking element for aiding in maintaining the connection of the collar members 22. For example, as illustrated in FIG. 4, a strap of material may be used to encircle the connected legs of the members 22 as an added safety feature to prevent their disconnection. Such a strap may be arranged to fasten with hook and loop material, whereby a user may conveniently remove the strap entirely from the device 20 or attach it as needed. In another embodiment, an end of the strap may be connected to one of the collar members 22 so that the strap does not become separated from the device 20. Of course, the strap may comprise two or more elements which may be connected rather than a single member which may be extended entirely around the connected members. As illustrated, the strap is useful in preventing separation of the collar members 22 in the event a user does not adequately connect them with the tabs 32, if the animal catches an item on the device 20 in a manner which acts to force the members 22 apart, or if the animal itself attempts to separate the members 22 by pressing upon them. Those of skill in the art will appreciate that one or more other locking or connecting elements may be useful in accomplishing such a purpose, including snaps and straps with snaps, rotating and other interlocking members.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A device for use in restraining an animal, comprising: two identical mating elements, each of said elements having a pair of outwardly extending legs, at least one passage on one leg and at least one tab on an opposing leg such that said elements may be connected by passing the at least one tab of each element through the at least one passage of the other element such that, when connected, said elements define an aperture which is generally enclosed by said elements.

2. The device in accordance with claim 1, wherein said aperture is adapted to accept a neck of the animal to be restrained.

3. The device in accordance with claim 1, wherein said elements are arch-shaped.

4. The device in accordance with claim 1, wherein said elements are generally planar.

5. The device in accordance with claim 1, wherein said elements are molded from a rigid plastic material.

6. The device in accordance with claim 1, wherein said at least one passage is generally square.

7. The device in accordance with claim 1, wherein each of said elements has at least two passages aligned in a row such that the size of said aperture may be adjusted.

8. The device in accordance with claim 1, wherein each tab comprises two protrusions spaced apart such that said protrusions must be biased inwardly towards one another to pass through said at least one passage.

9. The device in accordance with claim 8, wherein each tab has at least one catch on at least one of said protrusions for engaging said element when passed through a passage thereof such that the connected elements can only be released by biasing said protrusions inwardly towards one another to release said catch.

10. The device in accordance with claim 1, wherein at least a portion of said legs has a reduced thickness such that the entire device has a uniform thickness when said elements are connected to form said aperture.

11. The device in accordance with claim 1 wherein said at least one tab extends outwardly generally perpendicular to said leg.

12. A restraining device of the type to be worn around an animal's neck and serving to restrain said animal by increasing a dimension thereof, comprising:
two collar members, each collar member comprising a generally flat body having two legs extending therefrom, said legs each having a first end and a second end, said first ends of said legs connected to one another by said body and said second ends spaced apart from one another, at least one passage provided in one of said legs and at least one tab extending outwardly from the other of said legs, said collar members adapted to be connected to one another by passing at least one tab associated with each collar member through a passage of the other collar member, whereby a generally closed opening is provided through which an animal's neck may extend, with said collar members extending outwardly therefrom.

13. The device in accordance with claim 12 wherein said collar members are generally "C"-shaped.

14. The device in accordance with claim 12, wherein said collar members have multiple passages on at least one leg.

15. The device in accordance with claim 14, wherein said passages are generally aligned in a row along an axis extending from the first to the second ends of said leg.

16. A method of restricting movement of an animal comprising the steps of:

(a) providing a first collar member comprising a body having opposing first and second portions provided on either side of a generally arcuate recess in said body, at least one of said portions having a passage therethrough and at least one of said portions having a locking member extending therefrom;

(b) providing a second collar member identical to said first collar member; and (c) engaging said first and second collar members such that when connected, a neck of said animal is positioned in an opening defined by at least one of said recesses of said first and second collar members, and whereby said first and second collar members extend outwardly from said neck of said animal, increasing a dimension thereof and serving to restrict movement of said animal through areas having a dimension smaller than a dimension of said animal with said first and second collar members mounted thereon, said engaging step comprising engaging a locking member associated with each of said collar members with a passage associated with the other of said collar members.

17. The method in accordance with claim 16, wherein said collar members have multiple passages, and including the step of adjusting the size of said opening by selection of which of the said passages said locking member is engaged with.

18. The method in accordance with claim 17, wherein said locking member comprises first and second tab protrusions spaced apart from each other, and including the step of disengaging said collar members by compressing said protrusions towards one another and removing said at least one tab from said passage.

19. The method in accordance with claim 18, further including connecting a strap having hook and loop material associated therewith around said collar members when connected.

20. A device for use in restraining an animal, comprising:

two identical mating elements, each of said elements having a pair of outwardly extending legs, at least one passage on one leg and at least one tab on an opposing leg such that said elements may be connected by passing the at least one tab of each element through the at least one passage of the other element such that, when connected, said elements define an aperture which is generally enclosed by said elements, and wherein each tab comprises two protrusions spaced apart such that said protrusions must be biased inwardly towards one another to pass through said at least one passage.

21. The device in accordance with claim 20 wherein each tab has at least one catch on at least one of said protrusions for engaging said element when passed through a passage thereof such that the connected elements can only be released by biasing said protrusions inwardly towards one another to release said catch.

22. A device for use in restraining an animal, comprising:

two identical mating elements, each of said elements having a pair of outwardly extending legs, at least one passage on one leg and at least one tab on an opposing leg such that said elements may be connected by passing the at least one tab of each element through the at least one passage of the other element such that, when connected, said elements define an aperture which is generally enclosed by said elements, and wherein at least a portion of each of said legs has a reduced thickness such that the entire device has a uniform thickness when said elements are connected to form said aperture.

* * * * *